(12) United States Patent
De Boeck

(10) Patent No.: US 11,987,487 B2
(45) Date of Patent: *May 21, 2024

(54) TOUCHLESS BEVERAGE DISPENSING

(71) Applicant: HYDRATION LABS, INC., Charlestown, MA (US)

(72) Inventor: Yvan De Boeck, Medford, MA (US)

(73) Assignee: Hydration Labs, Inc., Charlestown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,271

(22) Filed: Mar. 15, 2023

(65) Prior Publication Data

US 2023/0211996 A1 Jul. 6, 2023

Related U.S. Application Data

(63) Continuation of application No. 17/573,164, filed on Jan. 11, 2022, now Pat. No. 11,634,313, which is a
(Continued)

(51) Int. Cl.
*B67D 1/08* (2006.01)
*B67D 1/00* (2006.01)
(Continued)

(52) U.S. Cl.
CPC ......... *B67D 1/0884* (2013.01); *B67D 1/0041* (2013.01); *B67D 1/0888* (2013.01);
(Continued)

(58) Field of Classification Search
CPC .. B67D 1/0884; B67D 1/0041; B67D 1/0888; G07F 9/001; G07F 9/009; G07F 13/065; G07F 13/06; G06Q 30/0226
See application file for complete search history.

(56) References Cited

U.S. PATENT DOCUMENTS 11,017,768 B2 5/2021 Crawford
11,059,713 B1 7/2021 Connor
(Continued)

OTHER PUBLICATIONS

International Preliminary Report on Patentability for International Application No. PCT/US2021/044290, dated Feb. 16, 2023, 13 Pages.
(Continued)

*Primary Examiner* — Timothy R Waggoner
(74) *Attorney, Agent, or Firm* — Morris, Manning & Martin, LLP; Daniel E. Sineway, Esq.; Adam J. Thompson, Esq.

(57) ABSTRACT

Systems and methods for beverage dispensing are disclosed herein. The beverage dispensing system can receive a connection request to pair a mobile computing device with a beverage dispensing device via a network. The connection request can include an identifier that can be verified to match a current identifier associated with the beverage dispersing device. The beverage dispensing system can generate a session between the mobile computing device and the beverage dispensing device that replicates a user interface of the beverage dispensing device on the mobile computing device. The beverage dispensing system can receive inputs from the mobile computing device during the session to obtain configuration parameters for a beverage and dispense the beverage from a nozzle based on the configuration parameters.

20 Claims, 4 Drawing Sheets

Related U.S. Application Data continuation of application No. PCT/US2021/044290, filed on Aug. 3, 2021.

(60) Provisional application No. 63/060,464, filed on Aug. 3, 2020.

(51) Int. Cl.
*G05B 19/042* (2006.01)
*G07F 9/00* (2006.01)
*G07F 13/06* (2006.01)

(52) U.S. Cl.
CPC .......... *G05B 19/042* (2013.01); *G07F 9/001* (2020.05); *G07F 13/065* (2013.01); *G05B 2219/2645* (2013.01)

(56) References Cited

U.S. PATENT DOCUMENTS

| | | | |
|---|---|---|---|
| 11,634,313 B2* | 4/2023 | De Boeck | B67D 1/0041 222/1 |
| 2005/0167482 A1 | 8/2005 | Ramachandran et al. | |
| 2010/0262282 A1 | 10/2010 | Segal et al. | |
| 2013/0245819 A1 | 9/2013 | Davenport et al. | |
| 2015/0032555 A1 | 1/2015 | Jones | |
| 2015/0082243 A1* | 3/2015 | Taylor | G06F 3/0482 715/814 |
| 2015/0169891 A1 | 6/2015 | Hook et al. | |
| 2016/0090288 A1 | 3/2016 | Givens, Jr. et al. | |
| 2018/0130053 A1 | 5/2018 | Matthews et al. | |
| 2018/0288594 A1* | 10/2018 | Kim | H04W 76/14 |
| 2020/0031654 A1 | 1/2020 | Wing et al. | |
| 2020/0031656 A1* | 1/2020 | Rudick | G06F 3/013 |

OTHER PUBLICATIONS

International Search Report and Written Opinion for International Application No. PCT/US2021/044290, dated Nov. 18, 2021, 14 Pages.

Youtube: "Coca-Cola Freestyle Mobile Pour-Contact-Free Pouring with Smart Phone," Coca-Cola Freestyle, Youtube Video, Jul. 13, 2020, 3 Pages, XP055905744, [Retrieved on Oct. 15, 2021] Retrieved from URL: https://www.youtube.com/watch?v=WcRxRgovISo.

* cited by examiner

TOUCHLESS BEVERAGE DISPENSING

CROSS-REFERENCE TO RELATED APPLICATIONS

This application is a continuation of U.S. patent application Ser. No. 17/573,164, filed Jan. 11, 2022 and entitled "TOUCHLESS BEVERAGE DISPENSING" which claims the benefit of, and priority to, International Application No. PCT/US21/44290, filed Aug. 3, 2021, titled "TOUCHLESS BEVERAGE DISPENSING," which claims the benefit of, and priority to, U.S. Provisional Patent Application No. 63/060,464, filed Aug. 3, 2020, titled "TOUCHLESS BEVERAGE DISPENSING," which are herein incorporated by reference in their entireties.

BACKGROUND

Generally, beverage dispensing systems require physical interactions with a user to dispense a beverage. For example, traditional beverage dispensers often require a user to push a cup into a lever corresponding to his/her desired beverage or place a beverage in front of a sensor before a beverage is dispensed. Other common beverage dispensers require that a user physically navigate through a user interface to select their desired beverage. As beverage dispensers are frequently used in workplaces, cafeterias, or the like, these conventional beverage dispensers experience high volumes of use from many different people. Thus, these beverage dispensers often become dirty and generally unclean from excessive touching, which not only requires routine cleaning but also introduces opportunities for spreading harmful germs. Accordingly, there exists a long-felt but unresolved need for systems and methods for beverage dispensing without physical interactions with the beverage dispenser.

BRIEF SUMMARY OF DISCLOSURE

Briefly described, and in various embodiments, the present disclosure relates to systems and methods for touchless beverage dispensing. Specifically, the present disclosure relates to touchless beverage dispensing systems and methods where a user may wirelessly connect his/her mobile computing device to a beverage dispenser for selecting, and subsequently dispensing, his/her beverage choice.

In various embodiments, the system includes at least a beverage dispensing device where the beverage dispensing device includes a display (e.g., touchscreen display, or the like), one or more servers (remote or local) operatively connected to the beverage dispensing device, and a mobile application and/or web platform accessible by a user via his/her mobile computing device. In at least one embodiment, the beverage dispensing device may generate and display a digital graphic including encoded information (e.g., a QR code, barcode, etc.), where the encoded information may include at least a unique identifier corresponding to the dispensing device, as well as instructions for directing a user to a web page, mobile application, or another appropriate digital environment for interfacing with the beverage dispensing device. For example, in at least one embodiment, the user may capture the digital graphic with a camera coupled to his/her mobile computing device (e.g., take a picture, orient the graphic to be in the camera's field of view, etc.), which in response causes the mobile computing device to prompt the user to navigate to a web page based on the data encoded in the graphic or to open a mobile application based on the graphic.

According to various aspects of the present disclosure, in response to navigating to the web page or mobile application corresponding to the graphic, the user is presented with a graphical user interface resembling, or mirroring, that of the display on the beverage dispensing device. In certain embodiments, the system establishes a WebSocket Secure (WSS) connection, or the like, between the mobile computing device and the beverage dispensing device (and/or server operatively connected to the beverage dispensing device). Accordingly, in particular embodiments, the user may control the beverage dispensing device via his/her mobile computing device. For example, in various embodiments, if a user were to select a particular beverage configuration on his/her mobile computing device, not only would the selections be received and registered by the beverage dispensing device, but any selections made on the mobile computing device would be replicated, or mirrored, onto the beverage dispensing device display.

In one embodiment, the connection (or dispensing session) between a user's mobile computing device and the beverage dispensing device terminates under various conditions. For example, the session may end after 20 seconds of inactivity. In other embodiments, the user may select to disconnect from the beverage dispensing device. In a particular embodiment, if the user navigates away from the web page or mobile application, the session may be terminated. In at least one embodiment, the beverage dispensing device may detect a Bluetooth signal from the mobile computing device, and the session may terminate if the Bluetooth signal is no longer detectable (e.g., if the user walks away from the beverage dispensing device).

According to a first aspect, a beverage dispensing method, comprising: A) receiving, via at least one computing device, a connection request to pair a mobile computing device with a beverage dispensing device via a network, the connection request comprising an identifier; B) verifying, via the at least one computing device, the identifier matches a current identifier associated with the beverage dispersing device; C) generating, via the at least one computing device, a session between the mobile computing device and the beverage dispensing device, wherein the session comprises replicating a user interface of the beverage dispensing device on the mobile computing device; D) receiving, via the at least one computing device, at least one input from the mobile computing device during the session to obtain configuration parameters for a beverage; and E) causing, via the at least one computing device, the beverage to be dispensed from a nozzle based on the configuration parameters.

According to a further aspect, the beverage dispensing method of the first aspect or any other aspect, further comprising: A) determining, via the at least one computing device, a duration of the session has exceeded a predefined timeout threshold; and B) terminating, via the at least one computing device, the session responsive to the duration exceeding the predefined timeout threshold.

According to a further aspect, the beverage dispensing method of the first aspect or any other aspect, further comprising: A) determining that the beverage has been dispensed from the nozzle; and B) terminate the session responsive to completion of the beverage being dispensed.

According to a further aspect, the beverage dispensing method of the first aspect or any other aspect, further comprising: A) receiving, via the at least one computing device, a plurality of current identifiers individually associated with a respective one of a plurality of beverage dispensing devices; and B) storing, via the at least one computing device each of the plurality of current identifiers in a data store.

According to a further aspect, the beverage dispensing method of the first aspect or any other aspect 1, further comprising: A) receiving, via at least one computing device, a second connection request to pair a second mobile computing device with a second beverage dispensing device via the network, the second connection request comprising a second identifier; B) verifying, via the at least one computing device, the identifier matches a current identifier associated with the beverage dispersing device; C) generating, via the at least one computing device, a session between the mobile computing device and the beverage dispensing device, wherein the session comprises replicating a user interface of the beverage dispensing device on the mobile computing device; D) receiving, via the at least one computing device, at least one input from the mobile computing device during the session to obtain configuration parameters for a beverage; and E) causing, via the at least one computing device, the beverage to be dispensed from a nozzle based on the configuration parameters.

According to a second aspect, a beverage dispensing system, comprising: A) a beverage service that, when executed by a network accessible computing resource, causes the network accessible computing resource to: 1) receive a plurality of identifiers from a plurality of beverage dispensing devices; 2) store each of the plurality of identifiers in a data store associated with a respective beverage dispensing device of the plurality of beverage dispensing devices; 3) receive a connection request from a mobile computing device via a network comprising a particular identifier; 4) identify a particular beverage dispensing device of the plurality of beverage dispensing devices based on the identifier and the data store; and 5) cause generation of a session between the mobile computing device and the particular beverage dispensing device, wherein the session comprises replicating a user interface of the particular beverage dispensing device on the mobile computing device; and B) the particular beverage dispensing device is configured to: 1) receive inputs via the mobile computing device during the session to obtain configuration parameters for a beverage; and 2) cause the beverage to be dispensed from a nozzle based on the configuration parameters.

According to a further aspect, the beverage dispensing system of the second aspect or any other aspect, further comprising an application that, when executed by the mobile computing device, causes the mobile computing device to: A) capture, via a camera of the mobile computing device, an image comprising a user interface of the particular beverage dispensing device; B) extract the particular identifier from the image; and C) transmit the connection request to the beverage service via the network.

According to a further aspect, the beverage dispensing system of the second aspect or any other aspect, further comprising an application that, when executed by the mobile computing device, causes the mobile computing device to extract an address associated with the beverage service from the image, wherein the connection request is transmitted to the address associated with the beverage service.

According to a further aspect, the beverage dispensing system of the second aspect or any other aspect, further comprising an application that, when executed by the mobile computing device, causes the mobile computing device to: A) generate the user interface from the particular beverage dispenser device on a display of the mobile computing device; B) receive a touch screen input via the user interface on the display; and C) send input data corresponding to the touch screen input to the particular beverage dispenser device.

According to a further aspect, the beverage dispensing system of the second aspect or any other aspect, further comprising an application that, when executed by the mobile computing device, causes the mobile computing device to: A) receive, via a microphone of the mobile computing device, a voice command; B) process the voice command to identify at least one input command; and C) transmit the at least one input command to the particular beverage dispenser device.

According to a further aspect, the beverage dispensing system of the second aspect or any other aspect, further comprising an application that, when executed by the mobile computing device, causes the mobile computing device to: A) perform, via a camera of the mobile computing device, an authentication of a current user using facial recognition; and B) send a confirmation of the authentication with the connection request to the beverage service.

According to a further aspect, the beverage dispensing system of the second aspect or any other aspect, wherein the particular beverage dispensing device is further configured to: A) generate a particular identifier of the plurality of identifiers; B) render a user interface comprising a particular identifier; and C) send the particular identifier to the beverage service.

According to a third aspect, a beverage dispensing apparatus, comprising: A) a display; B) a nozzle; and C) at least one computing device configured to: 1) generate a user interface on the display comprising an image with an identifier embedded within the image; 2) receive a connection request from a mobile computing device via a network comprising the identifier; 3) generate a session with the mobile computing device; 4) cause a current user interface to be continuously rendered on a second display of the mobile computing device during the session; 5) receive inputs via the second display of the mobile computing device during the session to obtain configuration parameters for a beverage; and 6) cause the beverage to be dispensed from the nozzle based on the configuration parameters.

According to a further aspect, the beverage dispensing apparatus of the third aspect or any other aspect, wherein the at least one computing device comprises at least one remote computing device and at least one local computing device, the at least one remote computing device in communication with the at least one local computing device via the network.

According to a further aspect, the beverage dispensing apparatus of the third aspect or any other aspect, wherein the at least one local computing device is configured to generate the user interface on the display comprising the image with the identifier embedded within the image and the at least one remote computing device is configured to: A) receive a connection request from a mobile computing device via a network comprising the identifier; and B) generate a session with the mobile computing device.

According to a further aspect, the beverage dispensing apparatus of the third aspect or any other aspect, wherein the image comprises a QR code that encodes the identifier.

According to a further aspect, the beverage dispensing apparatus of the third aspect or any other aspect, wherein the at least one computing device is further configured to: A) receive a second identifier from the mobile computing device, the second identifier corresponding to a mobile device identifier; B) load at least one configuration parameter from a user profile associated with the mobile device identifier; and C) set an initial value of a user interface component based on the at least one configuration parameter.

According to a further aspect, the beverage dispensing apparatus of the third aspect or any other aspect, wherein the mobile device identifier comprises at least one of a Identifier for Advertisers (IDFA) or a Unique Device Identifier (UDID).

According to a further aspect, the beverage dispensing apparatus of the third aspect or any other aspect, wherein the at least one configuration parameter comprises at least one of: a beverage size, a carbonation level, at least one flavor strength, and a temperature.

According to a further aspect, the beverage dispensing apparatus of the third aspect or any other aspect, wherein the at least one computing device is further configured to: A) receive a profile picture from the mobile computing device, the profile picture being associated with a user profile on the mobile computing device; and B) render the profile picture on the display of the beverage dispensing apparatus.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or similar elements of an embodiment.

DETAILED DESCRIPTION OF FIGURES

Figure 1:
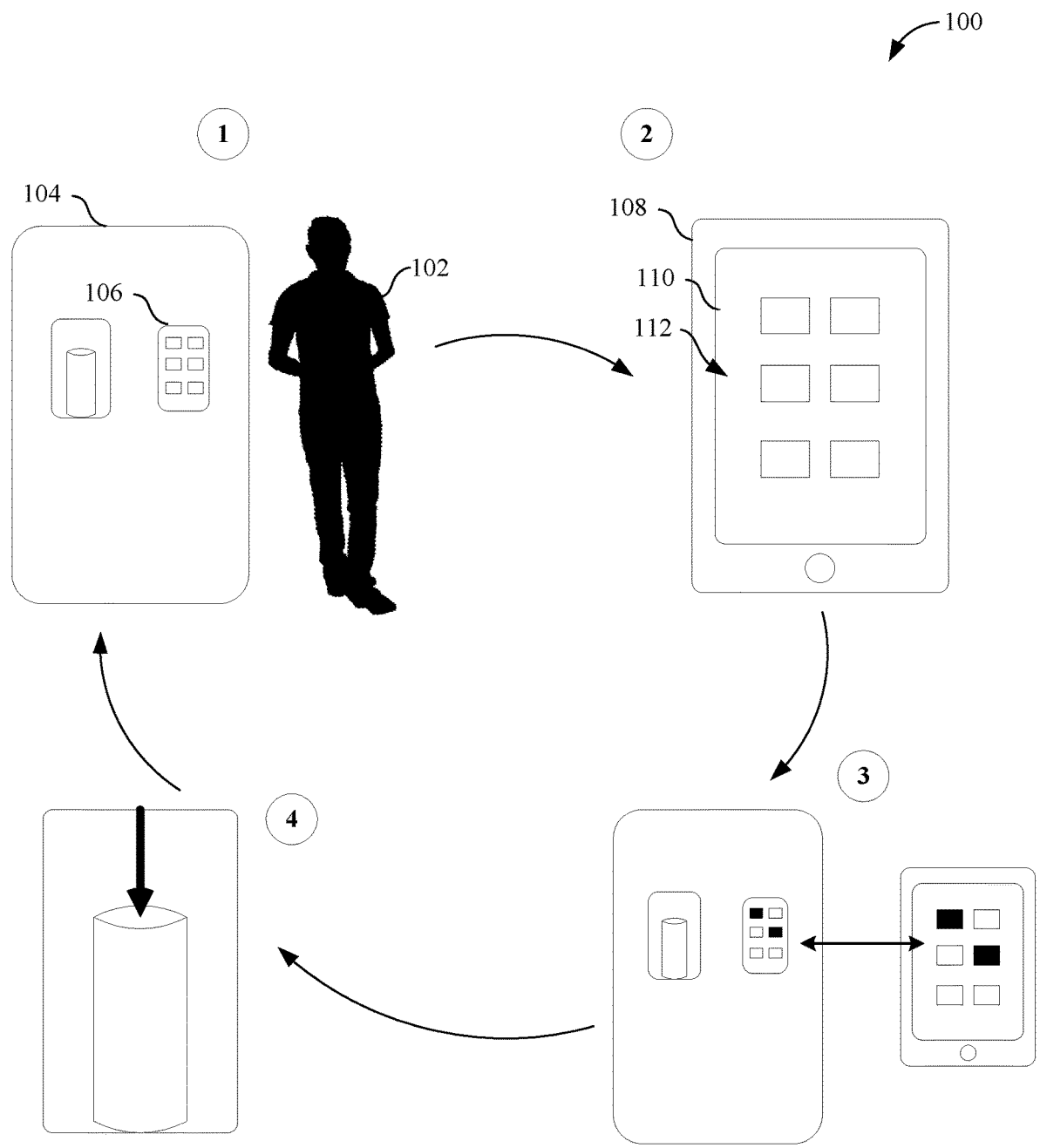
FIG. 1 is a diagram of an exemplary sequence of execution events according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and in various embodiments, the present disclosure relates to systems and methods for touchless beverage dispensing. Specifically, the present disclosure relates to a touchless beverage dispensing system and method where a user may wirelessly connect his/her mobile computing device to a beverage dispenser for selecting, and subsequently dispensing, his/her beverage choice.

In various embodiments, the system includes at least a beverage dispensing device where the beverage dispensing device includes a display (e.g., touchscreen display, or the like), one or more servers (remote or local) operatively connected to the beverage dispensing device, and a mobile application and/or web platform accessible by a user via his/her mobile computing device. In at least one embodiment, the beverage dispensing device may generate and display a digital graphic including encoded information (e.g., a QR code, barcode, etc.), where the encoded information may include at least a unique identifier corresponding to the dispensing device, as well as instructions for directing a user to a web page, mobile application, or another appropriate digital environment for interfacing with the beverage dispensing device. For example, in at least one embodiment, the user may capture the digital graphic with a camera coupled to his/her mobile computing device (e.g., take a picture, orient the graphic to be in the camera's field of view, etc.), which in response causes the mobile computing device to prompt the user to navigate to a web page based on the data encoded in the graphic or to open a mobile application based on the graphic. The unique identifier can be a pseudo-randomly generated token. The unique identifier can be used as a seed performing encryption- and decryption-based functions, such as, for example, encrypting and decrypting communications between a computing device and a computing environment and/or between a computing device and a beverage dispensing system. For example, the unique identifier can be a pseudo-random token that the system uses to generate a public-private key pair for securing a connection between a beverage dispensing system and a user's computing device.

According to various aspects of the present disclosure, in response to capturing the encoded information, the computing device navigates to the web page or mobile application corresponding to the graphic, the user is presented with a graphical user interface resembling, or mirroring, that of the display on the beverage dispensing device. In certain embodiments, the system establishes a WebSocket Secure (WSS) connection, or the like, between the mobile computing device and the beverage dispensing device (and/or server operatively connected to the beverage dispensing device). Accordingly, in particular embodiments, the user may control the beverage dispensing device via his/her mobile computing device. In one example, a user selects a particular beverage configuration on his/her mobile computing device. In the same example, the beverage dispensing system receives and registers the selections and any changes to the display based on the selections made on the mobile computing device are replicated (e.g., mirrored) onto the beverage dispensing device display.

In one embodiment, the connection (or dispensing session) between a user's mobile computing device and the beverage dispensing device terminates under various conditions. For example, the session may end after 20 seconds, 1 minute, or another suitable interval of inactivity or after a beverage is determined to have been dispensed. In other embodiments, the user may select to disconnect from the beverage dispensing device. In a particular embodiment, if the user navigates away from the web page or mobile application, the session may be terminated. In at least one embodiment, the beverage dispensing device may detect a Bluetooth signal from the mobile computing device, and the session may terminate if the Bluetooth signal is no longer detectable (e.g., if the user walks away from the beverage dispensing device).

Turning now to FIG. 1, a diagram 100 of the system operational environment is shown, according to one aspect of the present disclosure. In various embodiments, the system discussed herein includes a beverage dispensing system 104 (or otherwise referred herein simply as a "dispenser" or "beverage dispensing device") and one or more servers (not shown) operatively connected to the dispenser over a network. In particular embodiments, the beverage dispensing system 104 includes a display 106 (e.g., a touchscreen surface or the like) that allows users to navigate beverage options via the display. According to various aspects of the present disclosure, in response to a user selecting his/her beverage option, the beverage dispensing system 104 may dispense the beverage through a unique nozzle configured to allow for a plurality of beverage types to be dispensed through the same nozzle receptacle.

In various embodiments, the network connection provides a communication channel between the beverage dispensing system 104 and the one or more servers. The beverage dispensing system 104 can include physical controls for facilitating beverage dispensing operations. The beverage dispensing system 104 can be controlled touchlessly, for example, via a computing device 108 (also referred to as a "mobile computing device" or "mobile device"), gesture-based controls, voice-based controls, and/or automated scheduling. In some embodiments, the term "touchless" can include touching of the computing device 108 but not touching the beverage dispensing system 104. In one example, the computing device 108 can correspond to a personal smartphone device of a user of the beverage dispensing system 104, while the beverage dispensing system 104 can be a public or community beverage dispenser. Accordingly, the risk of contracting germs or getting sick from touching a community beverage dispenser is substantially greater than the risk of contacting germs or getting sick from touching a personal mobile device. As described herein, the beverage dispensing system 104 can "touchlessly" receive inputs from the computing device 108 by the user entering the touch commands on a touch screen of the computing device 108 instead of touching the display of the beverage dispensing system 104. In one example, the computing device 108 remotely commands the beverage dispensing system 104 to transition from an offline mode to an active dispensing mode.

In some embodiments, the beverage dispensing system 104 can be configured to a touchless mode in which the beverage dispensing system 104 is unresponsive to physical input and is only responsive to wirelessly received input. In at least one embodiment, a plurality of computing devices 108 may control the beverage dispensing system 104. For example, the computing device 108 can scan a digital graphic at the dispenser to initiate a communication session with the one or more servers, after which the user may make beverage selections from his/her mobile computing device. In certain embodiments, the beverage selections are then transmitted to the servers and relayed to the dispenser. In some embodiments, the beverage dispensing system 104 enforces an approve list or reject list of computing devices 108 such that the beverage dispensing system 104 may only be accessed by particular computing devices 108 that are recognized and/or registered (e.g., approve list) or are absent from a predetermined list of prohibited devices (e.g., reject list). In one example, the beverage dispensing system 104 requires that a controlling computing device 108 be connected to a particular wireless network (for example, a company Wi-Fi network).

The present embodiment includes a series of numbered steps, steps 1-4, which outline a high-level start-to-finish system sequence of events. As shown in the present embodiment, at step 1, the system sequence of events may begin when a user 102 interacts with the beverage dispensing device 104. For example, as shown in the present embodiment, the user 102 is standing at the beverage dispensing device 104, and the user may touch a display 106 at the beverage dispensing device 104. However, in preferred embodiments, the user 102 interacts with the beverage dispensing device 104 by scanning a digital graphic (e.g., a QR code, a barcode, etc.) presented on the beverage dispensing device display 106 with a camera coupled to his/her computing device 108. In response to scanning the digital graphic, the user's computing device 108 may launch a web browser 110 with a destination address based on the encoded data in the scanned digital graphic, as shown in the present embodiment at step 2.

According to various aspects of the present disclosure, at step 2, the web browser 110 displays a graphical user interface ("GUI") 112 corresponding to, or mirroring, the beverage dispensing device's display 106. For example, a change made by the user 102 at the display 106 on the beverage dispensing device 104 will be reflected, in real-time, on the GUI 112 on the user's computing device 108. This is shown in step 3 of the present embodiment, where a selection made on the computing device 108 (indicated as two darkened boxes) is mirrored onto the beverage dispensing device's display 106.

Proceeding now to step 4, the beverage dispensing device 104 dispenses the selected beverage (indicated as a downwardly-pointing arrow into a cup), based on the user's selection on the GUI 112 or display 106. In particular embodiments, the beverage dispensing device 104 may dispense the beverage for a predetermined amount of time corresponding to a specified volume of liquid (e.g., 3 seconds for 12 fluid ounces, 8 seconds 32 fluid ounces, etc.). In certain embodiments, the user may press and hold a button on the GUI 112 displayed on his/her mobile computing device for dispensing the beverage until he/she releases the button.

In response to the dispensing device completing a beverage dispensing session, the beverage dispensing device displays a new digital graphic for establishing a new session. As an example, the dispensing device may complete a beverage dispensing session in response to dispensing a beverage, exceeding an idle threshold, determining that a mobile device is outside of a predetermined distance from the dispensing device or some other basis. According to various aspects of the present disclosure, a user session may terminate after about twenty seconds of inactivity, if the user selects to disconnect from the session, if the user navigates away from the webpage/GUI 112, or if the user interacts with the display 106 on the beverage dispensing device. In various embodiments, a terminated session may not be restarted or resumed, and thus the system generates a new digital graphic to be presented on the beverage dispensing device for allowing the user (or another user) to begin a beverage dispensing session.

Figure 2:
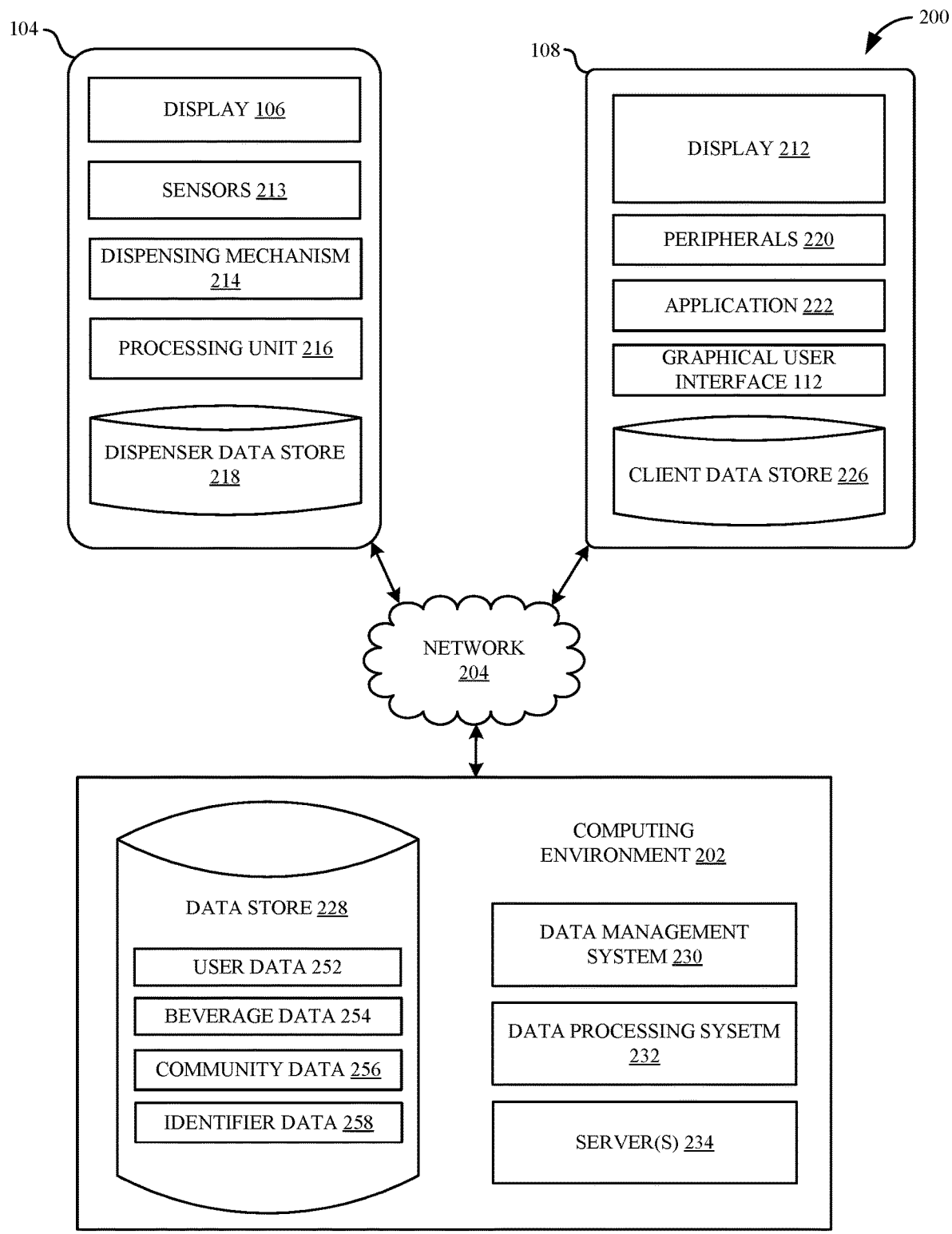
FIG. 2 is a diagram of an exemplary system architecture according to various embodiments of the present disclosure.

Turning now to FIG. 2, a system architecture 200 is shown, according to one aspect of the present disclosure. As discussed briefly above in association with the description of FIG. 1, and shown in the present embodiment, the system architecture 200 includes a computing environment 202, the computing device 108, and the beverage dispensing system 104, which are in data communication with each other via a network 204. The network 204 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, Bluetooth networks, Wi-Fi networks, NFC networks, and other types of networks.

For the foregoing explanations, the beverage dispensing system 104 and the computing device 108 can share a common user interface when connected (e.g., by streaming and/or rendering a common user interface at both devices). The foregoing explanations can alternately follow situations where the beverage dispensing system 104 and the computing device 108 are not connected. During a session, the features and examples described can receive inputs from a user using one or more of the beverage dispensing system 104 and/or the computing device 108.

The computing environment 202 can include, for example, a server 234 or any other system providing computing capability. Alternatively, the computing environment 202 can employ more than one computing devices and/or servers 234 that can be arranged, for example, in one or more server banks or computer banks or other arrangements. Such computing devices can be located in a single installation or can be distributed among many different geographical locations. For example, the computing environment 202 can include one or more computing devices that together can include a hosted computing resource, a grid computing resource, and/or any other distributed computing arrangement. In some cases, the computing environment 202 can correspond to an elastic computing resource where the allotted capacity of processing, network, storage, or other computing-related resources can vary over time.

Various applications and/or other functionality can be executed in the computing environment 202 according to various embodiments. Also, various data is stored in a data store 228 that is accessible to the computing environment 202. The data store 228 can be representative of one or more of data stores 228 as can be appreciated. The data stored in the data store 228 for example, is associated with the operation of the various applications and/or functional entities described below. The data store 228 can be locally distributed or cloud accessible and distributed over a large geographical location.

The components executed on the computing environment 202, for example, include a list of applications and other applications, such as services, processes, systems, engines, or functionality not discussed in detail herein. The computing environment can include a data management system 230 and a data processing system 232.

The data management system 230 of the computing environment 202 can distribute data accordingly throughout the data store 228. In various embodiments, the data management system 230 can aggregate data and distribute the data to other locations, such as, but not limited to, an individual computing device 108, a plurality of computing device 108, an individual beverage dispensing system 104, a plurality of beverage dispensing systems 104, and the data processing system 232. For example, if the computing device 108 requests beverage data 254 regarding a particular beverage combination, the data management system 230 of the computing environment 202 can send the particular drink data back to the computing device 108.

The data processing system 232 of the computing environment 202 can process data and produce particular actions. The data processing system 232 can employ particular algorithms to produce calculations with the data stored in the data store 228. In alternative embodiments, the data processing system 232 can receive data from the computing device 108 and/or the beverage dispensing system 104 and produce particular calculations according to the received data. The data processing system 232 can practice particular statistical, algorithmic, and machine learning processes to determine particular actions and outcomes. In some embodiments, the data processing system 232 employs machine learning processes that can create models used for recommendations and statistical analysis. For example, the data processing system 232 can use machine learning models to recommend a new drink to the particular user. In another example, the data processing system 232 of the computing environment 202 can receive monthly flavor usage reports from the beverage dispensing system 104. Continuing this example, the data processing system 232 can use statistical analysis methods to determine which flavors are the most and least popular. Continuing this example, the data processing system 232 can create automated response messages summarizing the statistical analysis created and send this information to people of interest.

The data stored in the data store 228 includes, for example, a list of data and potentially other data. The data store 228 can include, but is not limited to, user data 252, beverage data 254, community data 256, and identifier data 258.

The user data 252 can store all data related to the particular user that is visiting the beverage dispensing system 104. The user data 252 can include, but is not limited to, name, nickname, username, age, gender, user icon, location, health metrics (e.g., hydration goals, daily nutritional values, consumption schedules, etc.), health conditions (e.g., diabetic, hyperglycemic, etc.), IP address, cookie data, preferences, email address, telephone number, credentials, and passwords. Preferences can refer to preferred settings and/or options for beverages and beverage dispensing sessions. Non-limiting examples of preferences include drink flavor, flavor intensity level, flavor mixing ratio, volumetric preferences (e.g., for dispensing a particular volume of beverage), carbonation level, beverage temperature, and dispensing mode (e.g., random drink mode, predictive drink mode based on historical beverage data 254 of the user, historical drink mode based on past beverages, non-drink repetition mode in which beverages distinct from past-dispensed beverages are provided, recall previous drink mode, sample mode, and new flavor mode). The computing environment 202 can receive or collect user data 252 from the computing device 108, user inputs, and user accounts (for example, accounts registered to the system 200 or third party accounts, such as a user's Google, Apple, Microsoft, Facebook, or Amazon account). In one example, the user has an Apple device as the computing device 108 and connects to the beverage dispensing system 104 and/or the computing environment 202. In the same example, the beverage dispensing system 104 and/or the computing environment 202 receives user information from the Apple account after user verification. In another example, the application 222 accesses calendar data from a user's Google account and automatically generates and schedules hydration reminders based on calendar events and/or historical beverage dispensing data. In some embodiments, after a beverage dispensing session, the computing environment 202 presents the user with a user data input page through the graphic user interface 112 of the computing device 108. Continuing this example, once the data is input and submitted by the user, the data management system 230 stores the data in the user data 252. The user data 252 can be linked to other data storages that share the same user. For example, the beverage data 254 of a particular user can be linked back to the user data 252 of the same user.

The beverage data 254 can include any information that pertains to beverages dispensable or dispensed by the beverage dispensing system 104. The beverage data 254 can be associated with a particular beverage dispensing system 104, computing device 108, or user. The beverage data 254 can include, but is not limited to, drink combinations, drink popularity, drink preferences, and health specific drink. The beverage data 254 can include particular drink combinations that are commonly selected by a particular user or requested by a particular computing device 108. For example, the data processing system 232 can aggregate drink selections of a particular user after an initial dispensing session. Continuing this example, the data processing system 232 can create a drink preference of sparkling lemon strawberry that is consistently selected by the particular user and store this preference in the beverage data 254. Continuing this example, in the user's next visit, the computing environment 202 can send a suggested drink combination of sparkling lemon strawberry to the user through the computing device 108. Particular pre-created beverage combinations can be created and stored in the beverage data 254. For example, a user can use a display 212 of the computing device 108 to create a beverage that is specific for diabetics. Continuing this example, the user can request the computing device 108 to save this data and store it as a drink preference in the beverage data 254.

The community data 256 of the data store 228 can include any data related to community activity of a particular beverage dispensing system 104 or a plurality of beverage dispensing systems 104. The community data 256 can include, but is not limited to, frequent users of a particular beverage dispensing system 104, associates of a particular user (e.g., coworker identifiers and contact information, social media followers, etc.), common drink combinations among a group of people, user-created beverage combinations, and sharable beverage categories. In some embodiments, the computing environment 202 can aggregate data regarding consistent users of the same beverage dispensing system 104. The computing environment 202 can save this data in the community data 256 of the data store 228.

The identifier data 258 of the data store 228 can organize a plurality of unique identifiers specific to a plurality of beverage dispensing systems 104. The identifier data 258 can include a unique identifier specific to a beverage dispensing system 104. In some embodiments, each beverage dispensing system 104 includes a unique identifier and the computing environment 202 registers the beverage dispensing system 104 by receiving and storing the corresponding identifier. The data management system 230 can store the unique identifier as identifier data 258. In various embodiments, the identifier data 258 is indexable, which allows the data management system 230 and/or the data processing system 232 to find specific unique identifiers that pertain to a particular beverage dispensing system 104.

In various embodiments, the one or more computing devices 108 (e.g., smartphones, tablets, smartwatches, smart glasses etc.) may be used for navigating beverage dispensing options corresponding to a beverage dispensing system 104. Non-limiting examples of the computing device 108 include smartphones, laptops, tablet computers, smart accessories, electronic fobs, medical devices, and other mobile electronic devices. In one example, the computing device 108 is a user's cellphone. In another example, the computing device 108 is an electronic fob including a plurality of physical switches for controlling beverage dispensing preferences (e.g., flavor, flavor intensity, carbonation, temperature, volume, etc.). In this example, the beverage dispensing system 104 wirelessly reads the switch state of the electronic fob to initiate and appropriately configure a beverage dispensing session. The computing device 108 can include a display 212, peripherals 220, application 222, graphical user interface 112, and a client data store 226. In particular embodiments, the computing device 108 can connect wirelessly through the network 204 to communicate with the computing environment 202 and/or the beverage dispensing system 104. The computing device 108 can connect to a plurality of servers 234 and/or a single server 234. The computing device 108 can mirror the display 106 and controls of the beverage dispensing system 104.

The display 212 can facilitate communication and controls between the user and the beverage dispensing system 104. The display 212 can include, but is not limited to, a touch screen, an LCD display, an OLED display, a retina display, a haptic display, and a motion-sensitive display. In particular embodiments, the display 212 mirrors the display 106 of the beverage dispensing system 104. For example, when a user selects the user preferences section of the graphical user interface 112 of the computing device 108, the display 106 and the display 212 show the same user preference section.

The peripherals 220 of the computing device 108 can refer to any device or system used as an input for the computing device 108. The peripherals 220 can include, but are not limited to, a microphone, a LiDAR system, a camera, a keyboard, and control buttons. In some embodiments, the camera of the computing device 108 is used to scan the QR code present on the display 106 of the beverage dispensing system 104. In particular embodiments, when the camera of the computing device 108 scans the QR code of the beverage dispensing system 104, the computing device 108 processes the code and connects to the particular beverage dispensing system 104. In one example, once the computing device 108 is connected, the keyboard can send user typed information to search for particular flavors present in the beverage dispensing system 104. The control buttons of the computing device 108 can control the connectivity between the computing device 108 and the beverage dispensing system 104. For example, when activating the lock button of the computing device 108, the computing device 108 recognizes the device is in a sleep state and terminates the connection from the beverage dispensing system 104.

The application 222 of the computing device 108 can operate as a platform to interface the user to the connected beverage dispensing system 104 and/or the computing environment 202. The application can include, but is not limited to, a proprietary application designed by the beverage dispensing system 104 developers, and an internet browsing application. For example, the computing device 108 can activate a connection session between the beverage dispensing system 104 and the computing device 108 and activate a web URL extracted from the scanned QR code. Continuing this example, the internet browsing application can open the active web URL and present the user with a graphical user interface 112 shared between the computing device 108 and the beverage dispensing system 104. The proprietary application can be downloaded onto a computing device 108 to facilitate interfacing between the computing device 108, the beverage dispensing system 104, and the computing environment 202. The proprietary application can request user-specific information, such as, but not limited to, desired drinks and user preferences. The application 222 can facilitate communication between the computing environment 202, the beverage dispensing system 104, and the computing device 108. For example, if the user has ten seconds left in their active connection, the application 222 can forward a message to the user that states, "Your session is about to expire, would you like to extend your session?" In another example, the application 222 can receive a scheduled notification produced by the computing environment 202 recommending the user to offer beverages to clients and/or another person. In various embodiments, the application 222 can display hydration reports of the particular user.

The graphical user interface 112 can display any information to the user through the display 212. The graphical user interface 112 can be substantially mimicked on either display of the mobile computing device 108 and the beverage dispensing system 104. In some embodiments, the graphical user interface can display current drink selections, an amount of beverage dispensed, and/or any other information pertinent to the user.

The client data store 226 can include any information stored locally on the computing device 108. The data stored in the client data store 226 can include any user data the user wishes to keep locally rather than remotely on the computing environment 202. For example, the client data store 226 can include home address information that the user does not wish to share remotely.

The beverage dispensing system 104 can actively dispense and serve beverages to particular users. In some embodiments, the beverage dispensing system 104 includes the display 106, one or more sensors 213, a dispensing mechanism 214, a processing unit 216, and a dispenser data store 218. The sensors 203 can include, but are not limited to, audio sensors, motion sensors (e.g., ultrasonic, passive infrared, electromagnetic, or other sensors), cameras, weight sensors, temperature sensors, light sensors, pressure sensors, carbonation sensors, radiofrequency identification (RFID) sensors, Bluetooth modules, near field communication (NFC) modules, and other wireless network sensors.

The display 106 of the beverage dispensing system 104 can act similarly to the display 212 of the computing device 108. In particular embodiments, the display 106 can incorporate the same technology used for the display 212 of the computing device 108. In one or more embodiments, the display 106 and the display 212 are dissimilar in size. In alternative embodiments, the display 106 and the display 212 share the same size. The display 106 and 212 can share the same graphical contents when the beverage dispensing system 104 and the computing device 108 are connected.

The dispensing mechanism 214 of the beverage dispensing system 104 can hold and serve beverage components for a particular user. In some embodiments, the computing device 108 can send service requests to the beverage dispensing system 104 when a user would like to receive a particular beverage. The dispensing mechanism 214 can combine the necessary beverage components requested by the user and can dispense the beverage into a bottle.

The processing unit 216 can perform communication and dispensing functions and execute logical and analytical operations described herein. Computational operations of the processing unit 216 can include, but are not limited to, collecting, storing, and analyzing beverage data 254 (e.g., dispensed amount, beverage temperature, beverage type, beverage mix, carbonation level, sugar and other nutritional content, etc.), controlling software and credential settings, and monitoring system performance (e.g., beverage flavor levels, carbon dioxide levels, error codes, etc.). The processing unit 216 can send information to the computing environment 202 and/or the computing device 108 for further processing. The processing unit 216 can receive data from the computing environment 202 and computing devices 108. For example, the processing unit 216 receives beverage dispensing commands from a user's computing device 108. In another example, from the computing environment 202, the processing unit 216 receives beverage data 254 including identifiers, recipes, and nutritional data for beverages that were loaded into the beverage dispensing system 104.

The processing unit 216 and/or the data processing system 232 can increment counters to track beverage dispensing events. The counter can be specific to a particular beverage dispensing system 104 or group thereof (e.g., systems associated with a particular user or client), or the counter can be representative of all beverage dispensing systems 104. The counter can refer to a number of beverages dispensed or a metric representative of environmental impact or offset, such as, for example, a number of plastic bottles "saved" (e.g., by dispensing beverages into reusable vessels as opposed to using disposable bottles). The beverage dispensing system 104 or the computing device 108 can render one or more counters on the display 106 or display 212. For example, in response to a beverage dispensing event, the data processing system 232 increments a global "bottles saved" counter (e.g., based on the volume and/or quantity of beverages dispensed) and the processing unit 216 and the application 222 render the updated counter on displays 106, 212, respectively. In some embodiments, the processing unit 216 increments a counter in response to determining that the dispensing mechanism 214 has dispensed beverage for at least a threshold amount of time, such as, for example, 5 seconds, 10 seconds, 15 seconds, or another suitable interval.

The processing unit 216 can dynamically compute nutritional values pertaining to a requested and/or dispensed beverage. Non-limiting examples of nutritional values include caloric content, macros, carbohydrates, complex carbohydrates, simple carbohydrates, and sugars. The processing unit 216 can predict the nutritional content of a beverage based on various user-selectable parameters, such as flavor type, flavor strength, and beverage volume. The system 200 can provide the nutritional information to the user via the display 106 and/or display 212. In one example, the computing environment 202 generates a configuration file including nutritional data for each of a plurality of flavors available at a particular beverage dispensing system 104 and transmits the configuration file to the application 222 for use in determining and communicating nutritional data via a user interface. The application 222 can render nutritional data in a user interface including overall nutritional data for a beverage to-be-dispensed and individualized nutritional data pertaining to each available beverage flavor or other setting.

The computing environment 202 and/or the application 222 can transmit nutritional data to third party applications and services, such as, for example, a health monitoring application installed on a user's computing device 108. The computing environment 202 can generate and render on the beverage dispensing system 104 a scannable code for initiating communication between the system 200 and a third party application. The computing device 108 can scan the scannable code to allow the third party application to receive data from the system 200, such as, for example, nutritional data for a dispensed beverage.

The processing unit 216 and/or the data processing system 232 can analyze historical beverage data 254 and determine most and least desirable flavors, flavor intensities, flavor combinations, beverage temperatures, carbonation levels, and other preferences. The processing unit 216 can recall (e.g., from the dispenser data store 218) previous beverage dispensing sessions and initiate additional beverage dispensing sessions for the same beverage. The processing unit 216 can receive user inputs for adding icons, nicknames, or other identifiers to particular beverages or beverage flavors. For example, the processing unit 216 receives, from a computing device 108, an image for use as a custom flavor icon. In another example, the processing unit 216 receives and, stores as beverage data 254, user input that defines a beverage recipe and a nickname for the beverage. In another example, the processing unit 216 determines that a particular computing device 108 is most frequently associated with a particular beverage and, in response, renames the particular beverage to a nickname with which the computing device 108, or user thereof, is associated.

The dispenser data store 218 can store information related to the functionality of the beverage dispensing system 104. In some embodiments, the dispenser data store 218 can include, but is not limited to, identifier data, connection data, user history data, common drink data specific to that particular beverage dispensing system 104, and system health metric data. The identifier data of the dispenser data store 218 can refer to any identifier created and stored before, during, or after a particular connection with a computing device 108. In some embodiments, the dispenser data store 218 can share its data to the computing environment 202.

Next, a general description of the operation of the various components of the system architecture 200 is provided. To begin, the computing environment 202 and/or the beverage dispensing system 104 can have a predefined set of rules that determines that the computing device 108 has disconnected or to end a current session with the computing device 108. In some embodiments, when a computing device 108 scans a new QR code and/or any other form of scannable identifier while actively connected to a particular beverage dispensing system 104, the beverage dispensing system 104 will disconnect from the computing device 108. When a beverage dispensing system 104 has successfully dispensed a drink, the beverage dispensing system 104 can disconnect from a computing device 108. The beverage dispensing system 104 can incorporate near field signal receivers to detect a connected computing device 108, and disconnect the device when the beverage dispensing system 104 no longer detects the near field signals of the computing device 108. In various embodiments, the beverage dispensing system 104 includes a container monitoring sensor that recognizes when a bottle is removed and ends the connected session.

The computing environment 202 and/or the computing device 108 can conduct health monitoring of particular users to reduce risk of ingesting adverse content. In particular embodiments, the computing environment 202 can recognize devices with health monitoring services and extract pertinent data. For example, the computing environment 202 can recognize and interface with the Apple Health application to collect heart rate monitoring data and optimize beverage dispensing and/or beverage content based thereon. In another example, the computing environment 202, the beverage dispensing system 104, and/or the computing device 108 interfaces with a user's glucose monitor determine the current blood sugar level of the user. Continuing this example, the beverage dispensing system 104 can alert the user as to a low or high blood sugar level, display, or cause the computing device 108 to display, suggestions as to beverage sugar content, and/or dispense a beverage with an optimized level of sugar that is supportive of the user's health needs. The beverage dispensing system 104 can be configured to dispense health additives (e.g., vitamins, iron, minerals, etc.) into beverages based on user preferences, user input, or particular operating modes (for example, a health maintenance mode, illness mode, or exercise recovery mode).

The beverage dispensing system 104 can conduct automated disinfecting procedures at scheduled times with ultra-violet light and/or disinfectant solution. In particular embodiments, the beverage dispensing system 104 can produce hydration reports, goals, and/or reminders for users and send this information to the computing environment 202 and/or the particular user's computing device 108. The dispensing system 104 can include one or more temperature sensors 213 for measuring a user's temperature. The dispensing system 104 can determine if the user's temperature is within an acceptable interval (e.g., 97-99 degrees Fahrenheit, or another suitable value) and display and/or transmit an alert to the user if the temperature falls outside of the acceptable interval.

The beverage dispensing system 104 can communicate and connect/disconnect with the computing device 108 using a variety of methods. In some embodiments, the beverage dispensing system 104 and the computing device 108 recognize and connect to one another using Bluetooth, near field communication (NFC), RFID chips, voice processing, physical gestures, facial recognition, GPS similarities and geo fencing, and IP address mapping. In particular embodiments, the processing unit 216 of the beverage dispensing system 104 can actively search and access each connectivity method and connect with a computing device 108 when a method is satisfied.

In some embodiments, the computing environment 202 and/or the beverage dispensing system 104 can create a unique identifier for a particular beverage dispensing system 104, computing device 108, or beverage dispensing session. In some embodiments, a unique identifier can be deified as any combination of variables that are non-duplicative and specific to a particular device. Once the unique identifier has been created and assigned to a particular beverage dispensing system 104, the beverage dispensing system can store the identifier locally in the dispenser data store 218. In an alternative embodiment, the beverage dispensing system 104 can send the unique identifier to the computing environment 202 to store the data remotely.

The beverage dispensing system 104 can display the unique identifier in the form of a scannable code (e.g., barcode, QR code, numerical code) on the display 106. Along with the unique identifier, the scannable code can also include a script that prompts the computing device 108 to open the application 222, which displays the graphical user interface 112 after scanning the code of the beverage dispensing system 104. After the user has scanned the code using their computing device 108, a handshake is initiated between the computing device 108, the computing environment 202, or the beverage dispensing system 104. A handshake can be defined as a method of initiating a connection between two devices. In the case the handshake is conducted between the computing device 108 and the computing environment 202, the computing environment 202 receives the unique identifier information of the particular beverage dispensing system 104. Once the computing environment 202 receives the unique identifier from the computing device 108, the computing environment searches the identifier data 258 storage to verify a matching beverage dispensing system 104. Once identified, the computing environment 202 can establish a connection between the computing device 108 and the beverage dispensing system 104. The computing environment 202 can establish and facilitate a connection between the beverage dispensing system 104 and the computing device 108 by initiating a communication session between the two. For example, a request produced by the computing device 108 to dispense a beverage can travel through the computing environment 202, which then forwards this request to the beverage dispensing system 104. In an alternative embodiment, the computing device 108 can establish a local connection with the beverage dispensing system 104. When a handshake is initiated with the beverage dispensing system 104, the beverage dispensing system initiates a session between itself and the computing device 108. In various embodiments, a request made on the computing device 108 is simultaneously reflected by the beverage dispensing system 104. In one example, when a user requests to dispense a beverage, the computing device 108 sends a request through the network 204. Continuing this example, the network 204 facilitates a pathway that allows the request to reach the beverage dispensing system 104. Continuing this example, the beverage dispensing system 104 can receive the request and dispense the beverage.

As described herein, the beverage dispensing system 104 can operate in various modes (e.g., automatically or in response to user input). For example, the beverage dispensing system 104 can run in a sample mode, where the beverage dispensing system 104 serves samples to users to try different combinations of beverage settings (e.g., flavor, flavor intensity, flavor combination, carbonation level, temperature, additives, etc.). In another example, the beverage dispensing system 104 can allow several individuals to connect to the beverage dispensing system 104 to order drinks. Continuing this example, when several drinks have been ordered, the beverage dispensing system 104 will switch to a queuing mode, where beverages are served in the order they were received. In another example, the beverage dispensing system 104 can operate in a drink sharing mode by allowing a user to design and store a beverage recipe (e.g., flavor, flavor strength, carbonation, etc.) and transmit an alert to a computing device 108 that advertises the stored beverage recipe.

In another example, the beverage dispensing system 104 operates in a health gaming mode by recording beverage dispensing frequency for a plurality of computing devices 108 as a measure of a healthy hydration habit. In this example, the beverage dispensing system 104 can apply an award (for example, a digital badge) to a user corresponding to the top-ranked computing device 108. In a similar example, the computing environment 202 can determine that users of a beverage dispensing system 104 demonstrated a threshold-satisfying level of beverage dispensing and/or unique users and, in response, apply one or more awards to the beverage dispensing system 104 (for example, discounts on future flavors, access to particular flavors, digital badges, etc.).

In another example, the beverage dispensing system 104 operates in a flavor voting mode by allowing computing devices 108 and/or physical users to submit votes for a particular flavor or flavor combination. In this example, the beverage dispensing system 104 determines a top-ranked flavor or flavor combination and the computing environment 202 applies an award, such as a discount toward the refill of the flavor(s). In another example, the beverage dispensing system 104 includes a social media mode in which the beverage dispensing system 104 or computing environment 202 determines that a photo or video of a dispensed beverage has been posted to an online platform, such as a social media site. In the same example, the computing environment 202 applies an award in response to the posting (e.g., or based on determining a threshold-satisfying level of postings have been submitted). In another example, the application 222 of the computing device 108 allows users to send and receive beverage recipes and beverage "challenges" that may be redeemed and recorded at the beverage dispensing system 104.

In various embodiments, the network 208 may be a wired or wireless network capable of supporting an internet connection. In particular embodiments, in response to a user capturing a digital graphic via his/her mobile computing device (as discussed in association with FIG. 1), the system can establish a real-time communication link/session between the web browser (or mobile application) on the mobile computing device and the one or more servers. In at least one embodiment, this communication link supports wireless connections such as WebSocket Secure ("WSS") connections over Transmission Control Protocol ("TCP"), and the like.

Figure 3:
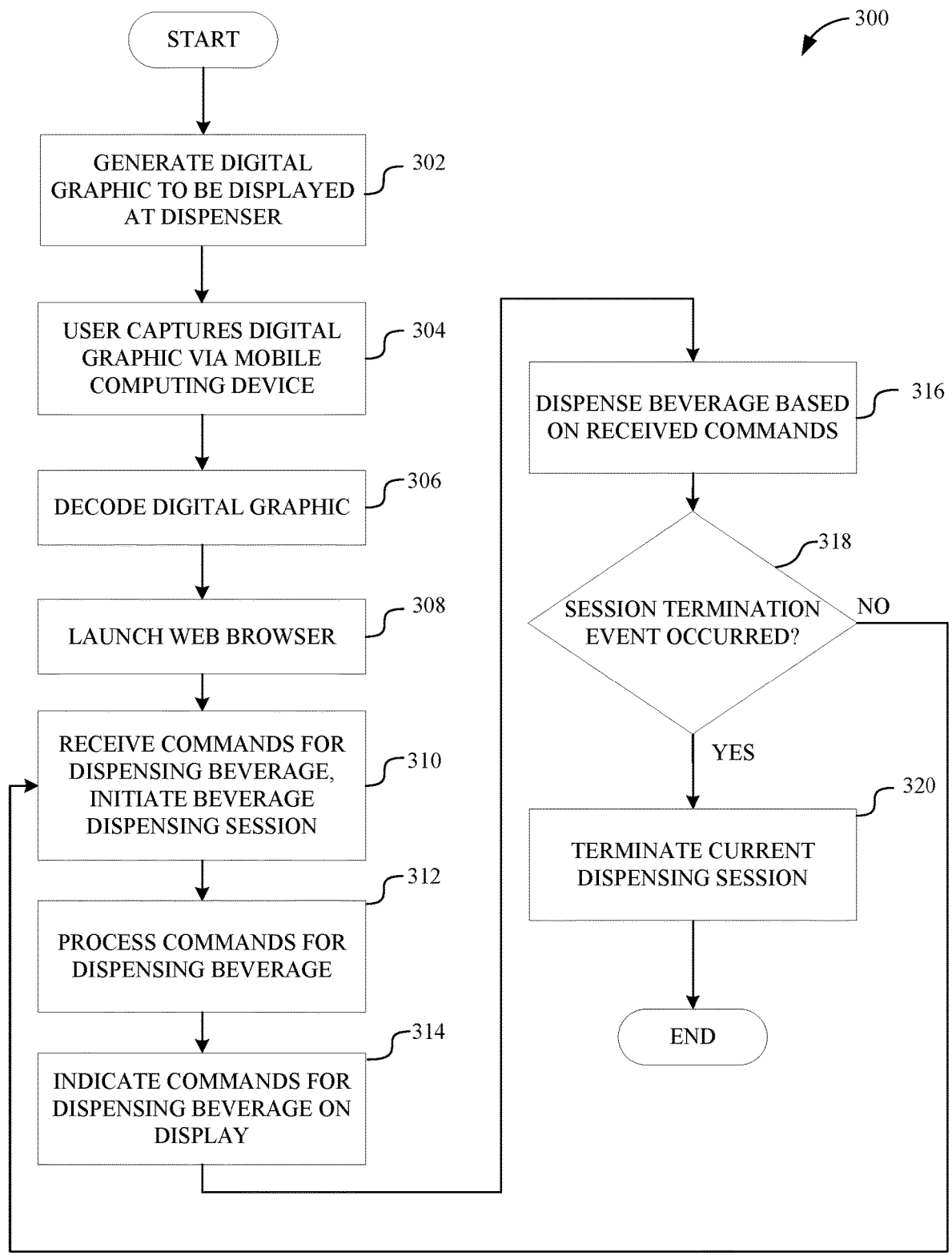
FIG. 3 is a flowchart of an exemplary system dispensing process according to various embodiments of the present disclosure.

Turning now to FIG. 3, a flowchart illustrating an exemplary system dispensing process 300 is shown, according to one aspect of the present disclosure.

At step 302, the process 300 includes generating and displaying a digital graphic on the beverage dispensing system. The digital graphic can include a unique identifier corresponding to the beverage dispensing system 104 and/or a networking address that may be accessed to control the beverage dispensing system 104. In a particular embodiment, the one or more servers 234 may generate the digital graphic, or the beverage dispensing system 104 may generate the graphic. The graphic may be a QR code, barcode, watermark, or another similar scannable graphic that is representative of encoded data corresponding to the dispenser. In some embodiments, a computing device 108 detects the beverage dispensing system 104 via Wi-Fi, Bluetooth, near field communication, or the like, and, in response, the application 222 initiates a beverage dispensing session.

At step 304, the process 300 includes capturing or scanning the digital graphic with a camera (or another appropriate sensor) of the computing device 108. In some embodiments, to capture the digital graphic the user may point his/her camera at the graphic and the application 222 may recognize the digital graphic as a graphic including encoded data for initiating a beverage dispensing session at the corresponding beverage dispensing system 104.

At step 306, the process 300 includes decoding the digital graphic to obtain a beverage dispensing system identifier and/or a networking address (e.g., or other instruction) for initiating a beverage dispensing session. In various embodiments, the encoded data in the digital graphic may include a unique identifier corresponding to the particular beverage dispensing device. In certain embodiments, the digital graphic may also include instructions for launching a web browser and directing the web browser to a particular web address. In other embodiments, the digital graphic includes instructions for launching a mobile application. The application 222 can receive the digital graphic or a beverage system identifier via user input and communicate with the computing environment 202 to associate the user's computing device 108 with the beverage dispensing system 104.

At step 308, the process 300 includes launching a web browser and accessing a network address at which the beverage dispensing system 104 may be controlled or launching the application 222 (e.g., in a mode operative for controlling the beverage dispensing session). In various embodiments, launching a webpage allows for a user to select from various beverage dispensing options from a GUI on his/her mobile computing device, instead of navigating a substantially similar GUI on a display at the dispenser (described in greater detail below in association with FIG. 4).

The system 200 can perform an initial "handshake" protocol between the beverage dispensing system 104 and the computing device 108 to determine the capabilities of the beverage dispensing system 104 and, based thereon, generate a machine-accurate user interface to provide to the computing device 108. The handshake protocol can include determining available settings, features, and properties of the particular beverage dispensing system 104 in use and providing a corresponding user interface to the computing device 108 based thereon. The computing environment 202 can initiate the handshake protocol in response to determining the web browser of the computing device 108 has accessed a particular network address (e.g., that was obtained from scanning a code). The computing environment 202 can receive or collect, from the beverage dispensing system 104, a set of capabilities of the beverage dispensing system 104. Non-limiting examples of capabilities include flavors, flavor strength, carbonation level, temperature, and beverage volume. For example, the computing environment 202 receives a mapping of system features corresponding to the beverage dispensing system 104. The computing environment 202 and/or the application 222 can generate a user interface based on the set of beverage dispensing capabilities. The computing environment 202 can host the user interface at the particular networking address, thereby providing means for the computing device 108 to control the beverage dispensing system 104.

The computing environment 202 can construct the user interface based on a static or dynamic template. For example, the computing environment 202 can retrieve a static template including fields for all possible beverage flavors and the computing environment 202 can render a subset of the plurality of fields as user-selectable based on available flavors of the corresponding beverage dispensing system 104. In another example, the computing environment 202 can retrieve a dynamic template including a set of flavor fields and the computing environment 202 can populate each of the set of flavor fields with information describing a particular flavor that is currently available at the beverage dispensing system 104. The computing environment 202 can generate a configuration file that includes the user interface template and/or data that may be rendered there within. In one example, the computing environment 202 determines the available flavors at the beverage dispensing system 104 and generates a configuration file including flavor icon images (e.g., or pointers for accessing the same) for only the available flavors. The browser of the computing device 108 can receive the configuration file from the computing environment 202 by any suitable means, such as, for example, via the particular network address with which the beverage dispensing system 104 is associated. According to one embodiment, generating the configuration file based on the capabilities of the particular beverage system provides for more efficient load times (e.g., as the browser of the computing device 108 need only download files pertaining to capabilities of the particular beverage dispensing system in use). It will be understood and appreciated that the process of identifying beverage dispensing system capabilities, generating the configuration file, and generating the user interface based on the configuration file may occur in virtually real-time in response to the browser of the computing device 108 navigating to the particular network address.

Following the handshake protocol, the computing device 108 can transmit the status of the user interface (e.g., selections, deselections, etc.) and the beverage dispensing system 104 can transmit its status (e.g., settings, dispensing status, etc.) to the computing environment 202 at regular, repeating intervals (e.g., 20 ms, 100 ms, 200 ms, or another suitable period). The computing environment 202 compare the statuses of the user interface and the beverage dispensing system 104 and can determine changes to the user interface based thereon. The computing environment 202 can generate one or more commands for adjusting the operation of the beverage dispensing system 104 (e.g., and a user interface rendered thereon) based on differences between the statuses of the beverage dispensing system 104 and the user interface. For example, the computing environment 202 can determine that the beverage dispensing system 104 is currently configured to a watermelon flavor setting at 50% strength and that the user interface includes a configuration for a peach flavor setting at 75% strength. In the same example, based on the differences in settings, the computing environment 202 generates a command to configure the beverage dispensing system 104 to a peach flavor setting at 75% strength. It will be understood and appreciated that the generation, transmission, and comparison of system and user interface status can occur in virtually real-time such that a setting change initiated on the user interface may be reflected and acted upon in virtual real-time at the beverage dispensing system 104. The process of syncing user interface and system settings can occur continuously at a predetermined interval until termination of the beverage dispensing session for the corresponding beverage dispensing system 104.

At step 310, the process 300 includes receiving one or more commands from the computing device 108 (e.g., or from sensors 213, such as a fob-based command, a gesture-based command, or a voice command) and initiating a beverage dispensing session. In various embodiments, at step 310, the user's beverage dispensing commands are received at the computing environment 202 or the data processing unit 216. According to various aspects of the present disclosure, the commands may be translated at the computing device 108 into a specific communication protocol, such as TCP (or the like), for allowing the commands to be transmitted to the beverage dispensing system 104 over the WSS communication link. In response to the server 234 receiving the beverage dispensing commands, the server 234 may furthermore transmit the commands to the corresponding beverage dispensing device (e.g., based on the unique identification number included in the transmission package). In some embodiments, the server 234 may store the user's beverage dispensing selection for future use. For example, in response to connecting the beverage dispensing device in a future session, the server may suggest dispensing the same beverage selection as selected in a prior session. As an example, the server 234 may preselect the same beverage as a default option, reorder the beverage configuration options according to historical data for a particular user account (e.g., favorite flavor, preferred carbonation level, preferred temperature, etc.). As another example, the server may highlight a last beverage or favorite beverage for easy identification. As another example, the server 234 can default beverage dispensing to a most recently dispensed beverage, a most recently requested beverage, a new beverage (e.g., based on historical beverage data 254), a sample beverage, or a preferred beverage (e.g., based on user data 252 and/or historical beverage data 254).

At step 312, the process 300 includes processing the one or more commands (e.g., remotely at the server 234 or locally at the beverage dispensing system 104). For example, the command may include an indication of a particular flavor, carbonation level, preferred beverage temperature, beverage volume, etc. The server 234 or the application 222 can transmit the commands to the data processing unit 216 of the corresponding beverage dispensing system 104. In response to the one or more commands, the data processing unit 216 configures the beverage dispensing system 104 to appropriately prepare and dispense a beverage and, in some embodiments, execute additional functions described herein (for example, generating and transmitting a hydration report based on historical user and beverage data, incrementing a counter for tracking flavor consumption, or communicating with a health information application of the computing device 108).

At step 314, the process 300 includes updating the display 106 of the beverage dispensing system 104 to indicate the one or more commands. In some embodiments, step 314 occurs prior to dispensing the beverage. According to various aspects of the present disclosure, the display 106 mirrors, in virtually real-time, a graphical user interface (GUI) rendered on the computing device 108. For example, in response to receiving a selection of a particular beverage flavor to be dispensed via the GUI at a computing device 108, the display 106 automatically updates to reflect the selection (e.g., as though the selection were made on the dispenser display). Similarly, when a selection of a particular beverage flavor is received via the beverage dispensing system 104, the display 212 of the computing device 108 automatically updates in virtually real-time to reflect the selection. Further, any visual or audio features may also be reflected on both displays. As an example, when a touch indication is received at the mobile display on an icon, an icon push animation can be rendered on both the display of the mobile device and the display of the beverage dispenser simultaneously. Further, a speaker of the mobile device and a speaker on the beverage dispenser may both simultaneously play a "click" sound when a touch input is received on either display. To facilitate the simultaneous rendering of audio and video, the system may process commands (e.g., touch or other inputs) to trigger a change in graphics or audio, and update both the beverage dispenser and mobile device at the same time.

In some embodiments, a delay may be determined between the computing device 108 and the beverage dispensing system 104. As an example, the server 234 may determine that the computing device 108 is 200 milliseconds (ms) behind the beverage dispensing system 104 based on network delays. The network delay may be determined by comparing send and receive times on acknowledge messages or other messages. The network 204 delay may result from delays in cellular communication, Wi-Fi communication, travel time to a remote data center, or other network or processing related delays. As an example, the beverage dispensing system 104 may transmit a ping to the computing device 108 and receive an acknowledgement response. If the roundtrip time of the message is 400 ms, the beverage dispensing system 104 may determine that the delay for transmission of messages is 200 ms or half the time to transmit and receive. In some example, the beverage dispensing system 104 may delay updating its own display by up to 200 ms to provide better synchronization with the computing device 108.

The server 234 may transmit commands to update the GUI of the computing device 108, such as, for example, a command to highlight a particular flavor (e.g., the command causing the computing device 108 to update the display 212 to highlight the particular flavor). In some embodiments, a video or image stream may be fed via the web interface. The streamed feed may include the highlight of the particular flavor responsive to the selection.

At step 316, the process 300 includes dispensing a beverage based on the one or more commands. In particular embodiments, dispensing the beverage may include providing a combination of water, flavor, carbonation, etc., through a nozzle (to be received in the user's cup/container) based on the user's beverage selection.

At step 318, the process 300 includes determining whether a session termination event has occurred. The session termination event generally refers to an event, input, status, or variable change that indicates a beverage dispensing session is to be terminated. In other words, a session termination event may provide an indication that a current user has completed their beverage dispensing experience or, otherwise, that control of the beverage dispensing system 104 by the computing device 108 (e.g., or another input source) should be suspended. In response to determining one or session termination events have occurred, the process 300 can proceed to step 320. In response to a session termination event has not occurred, the process 300 can proceed to step 310 and await additional commands. In some embodiments, the process 300 requires determination of multiple session termination events to proceed to step 320. In one example, to proceed to step 320, the data processing unit 216 determines occurrence of a first session termination event including an elapsed session timer and occurrence of a second termination event including beverage dispensing confirmation. In another example, the data processing unit 216 determines that a user has moved beyond a predetermined proximity of the beverage dispensing system 104 and that a browser of the user's computing device 108 has navigated away from a network address for controlling the beverage dispending system 104. In another example, the system 200 determines termination event occurrence by determining that a command has been received from a new computing device 108 (e.g., the new command being associated with the same beverage dispensing system 104). In some embodiments, in response to determining that an additional command has been received from the same computing device 108, the process 300 proceeds to step 312.

The data processing unit 216, data processing system 232, or application 222 can determine that a session termination event has occurred by determining that a predetermined time threshold has been exceeded (or, in other words, a predetermined session timer has elapsed). The processing unit 216 can initiate a beverage session timer, for example, following the dispensing of a beverage or following the most recently received input from the computing device 108. The processing unit 216 can compare a current value of a beverage session timer to a predetermined time threshold. In at least one embodiment, the processing unit 216 initiates a timer when a new dispensing session is started, when a beverage begins dispensing, and/or after a beverage is finished dispensing. The processing unit 216 can compare the timer value to the predetermined time threshold. In response to determining the timer value meets or exceeds the predetermined time threshold, the process 300 can proceed to step 320. In response to determining the timer value does not meet the predetermined time threshold, the process 300 can proceed to step 310 and/or remain at step 318 and continue monitoring for session termination events or additional commands. In some embodiments, the dispenser system 104 is configured such that the processing unit 216 does not enforce a dispensing session time threshold. For example, the application 222 receives user input for disabling a session timer setting and, in response, the processing unit 216 configures such that exceeding the predetermined time threshold does not result in beverage session termination.

In one example, in response to the beverage being dispensed (or currently still dispensing), the data processing unit 216 determines if a predefined time threshold for the session is exceeded (or some other session-ending event has occurred). In this example, if 20 seconds pass after a beverage has been dispensed without the system 200 receiving additional commands to further dispense a beverage, the data processing unit 216 determines that a session termination event has occurred. In the same example, prior to proceeding to step 320, the process 300 may include determining occurrence of a second session termination event, such as receiving a command to terminate the beverage dispensing session. The system 200 can determine a session continuation event has occurred, such as, for example, receiving additional commands, determining sustained presence of a beverage container at the beverage dispensing system 104, or determining additional interaction of a computing device 108 with a webpage for controlling the beverage dispensing session. In one example, the beverage dispensing system 104 receives an additional command for dispensing an additional volume of a currently dispensing beverage or for an entirely new beverage. In response to receiving new commands for dispensing a beverage, the process 300 may return to step 312.

In some embodiments, determining session termination event occurrence includes determining that a confidence metric satisfies a predetermined confidence threshold. The confidence metric can represent a level of likelihood (e.g., a scaled value) that a beverage dispensing session may be appropriately terminated. The processing unit 216, data processing system 232, and/or application 222 can determine the confidence metric based on various data including, but not limited to, beverage dispensing timers or counters, proximity sensor data (e.g., readings from ultrasonic sensors, infrared sensors, electromagnetic field sensors, and other sensors for detecting proximity of a user or object), weight sensor data, light sensor data, Bluetooth signal data, near field communication data, Wi-Fi signal data, geolocation data, user input data (e.g., or lack of user inputs), biometric data (e.g., voice data, gesture recognition data, facial recognition data, etc.), user preference data, and analyses of historical beverage dispensing data. The processing unit 216 can generate a confidence metric by applying weight values to and combining various data. The weight values can be based on analyses of historical beverage dispensing data and/or heuristics. The processing unit 216 can generate and train a machine learning model (e.g., artificial neural network, a machine learning model, or other suitable model) to analyze historical beverage dispensing data and determine one or more subsets of the data that were most predictive for the termination of a beverage dispensing session. By determining a ranking of most-predictive and least-predictive data sources, the processing unit 216 can configure correspondingly high or low weight values for controlling the contribution of each data source to future confidence threshold metrics. In one example, the processing unit 216 determines that user input data (e.g., navigation away from a beverage webpage, selection of a session termination field, locking of a computing device, etc.) and beverage container detection data are most predictive for beverage session termination and that a dispensing timer data is least predictive for beverage session termination. Continuing the example, the processing unit 216 assigns higher weight values to user input data and beverage detection data and assigns a comparatively lower weight value to dispensing timer data.

The processing unit 216 can analyze historical beverage dispensing data and determine a confidence metric threshold for determining whether a beverage dispensing session may be terminated. The confidence metric threshold generally refers to a confidence value to which the confidence metric is compared (e.g., meeting or exceeding the threshold corresponds to a determination that a beverage dispensing event has concluded and thus the session is to be terminated). The processing unit 216 can determine the confidence metric threshold by modeling historical beverage dispensing sessions, computing historical confidence metrics, and training a machine learning model to estimate an optimal threshold value for determining whether a beverage dispensing event has concluded.

In at least one embodiment, the system 200 determines a session termination event occurred in response to determining that a new user (e.g., or new computing device 108) has attempted to initiate a beverage dispensing session. For example, the data processing system 232 determines that a new computing device 108 accesses a network address for controlling the beverage dispensing system 104. In another example, the processing unit 216 determines that a new computing device 108 has moved within a predetermined proximity of the beverage dispensing system 104 (e.g., based on Bluetooth data, NFC data, Wi-Fi data, image data, electromagnetic data, ultrasonic data, PIR data, RFID data, user inputs, etc.). In another example, the data processing unit 216 determines that a new beverage container has been placed within a predetermined proximity of the beverage dispensing system 104. In another example, the application 222 determines that the corresponding computing device 108 has navigated away from a network address at which the dispensing system 104 was accessed (e.g., a user has exited their device's browser, closed the application 222, initiated another device application, etc.). In another example, the data processing unit 216 records and/or receives a user's speech, processes the speech and identifies a command to terminate the beverage dispensing session, and, in response, executes the command.

The computing environment 202 can determine a session termination event occurred in response to detecting a lapse in communication from the computing device 108. The computing environment 202 can determine communication lapse based on a duration of time elapsed from a most recent transmission (ex., 15 seconds, 20 seconds, 45 seconds, etc.) or based on a number of predicted transmissions that were determined to not have occurred within a predetermined interval (e.g., 5 transmissions missed in 3 seconds, 10 transmissions missed in 5 seconds, etc.). In one example, the data processing system 232 determines that 21 seconds have elapsed since receiving a transmission from the computing device 108. Continuing the example, the data processing system 232 compares the 21 second elapsed period to a 20 second session termination threshold and determines that the threshold is satisfied and thus a session termination event has occurred. The computing environment 202 can adjust the session termination threshold based on a current status of the beverage dispensing system 104. For example, when the beverage dispensing system 104 is actively dispensing a beverage, the computing environment 202 can increase the session termination threshold. As another example, in response to determining the beverage dispensing system 104 has completed dispensing a beverage, the computing environment 202 can decrease the session termination threshold.

At step 320, the process 300 includes terminating the beverage dispensing session. The system 200 may terminate the beverage dispensing session by disconnecting the WSS communication link between the server (or dispenser) and the web browser running at the user's mobile computing device. In certain embodiments, for terminating the beverage dispensing session, the system may generate a new code stored at the server (and/or dispenser), and any dispensing session established with a prior code may no longer be valid (as any prior codes would not match the new code). Accordingly, in various embodiments, the process 300 may return to the step 302 for generating a new code for a beverage dispensing session. In particular embodiments, the new code generated at step 302 may be further transformed into a digital graphic scannable by a user with his/her mobile computing device, thus allowing the user to make a beverage dispensing selection on his/her mobile computing device, rather than on the beverage dispensing device display.

Figure 4:
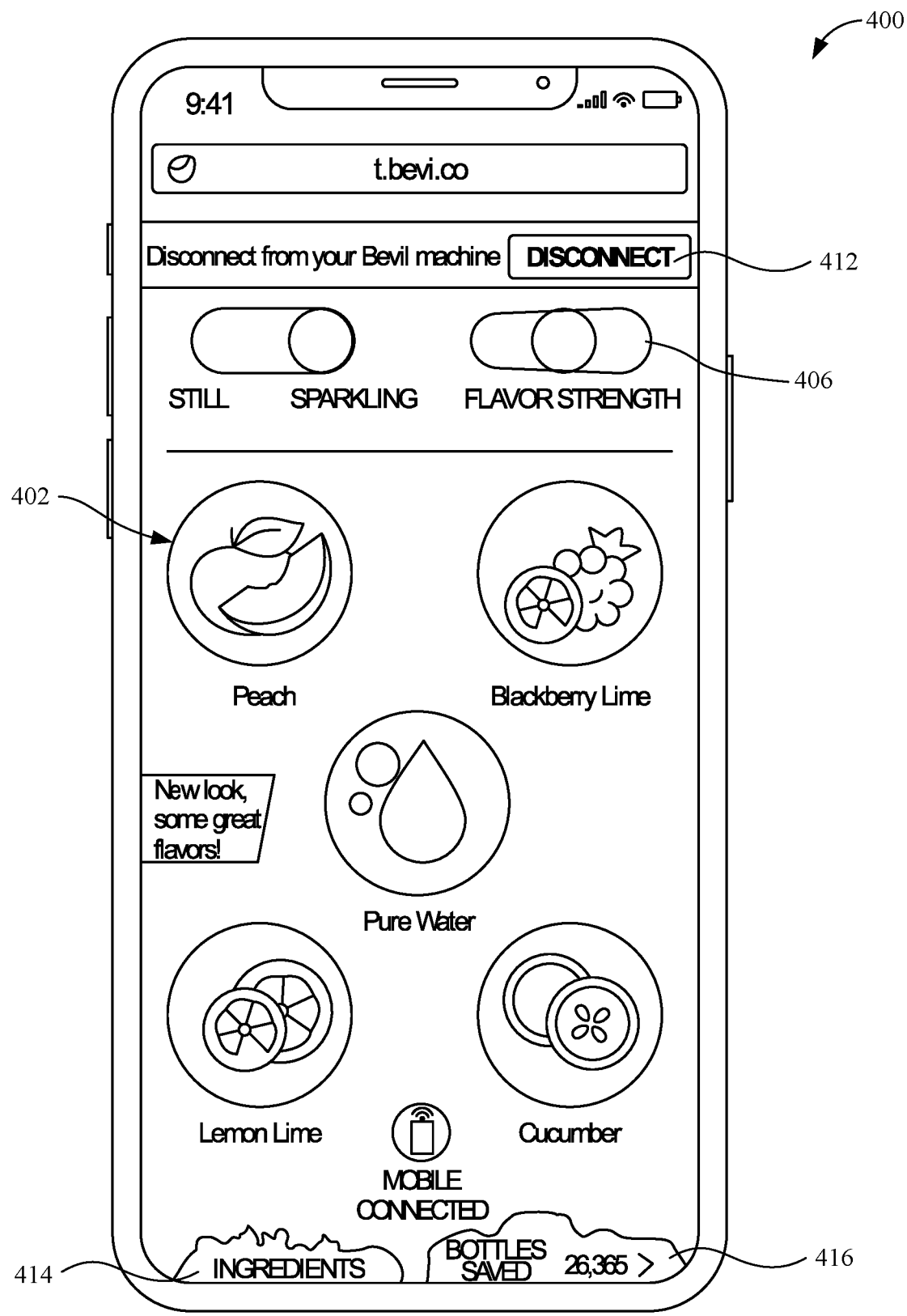
FIG. 4 is a screenshot of an exemplary GUI on a mobile computing device for controlling the beverage dispensing device according to various embodiments of the present disclosure.

Turning now to FIG. 4, a screenshot 400 of an exemplary GUI is shown, according to one aspect of the present disclosure. In at least one embodiment, the screenshot shown in the present embodiment is displayed on a user's mobile computing device in response to the user scanning a digital graphic (e.g., a QR code) on a beverage dispensing device. In various embodiments, the screenshot shown in the present embodiment includes options such as a plurality of favor options 402 (or plain water 404), flavor strength 406 (also referred to as flavor intensity), and carbonation level 408. The GUI may also display a connectivity status 410, and also a selectable option 412 for the user to disconnect from a connected dispensing machine. In certain embodiments, the GUI may also display information such as the ingredients 414 in a particular selected beverage, and the number of bottles saved 416 by using the beverage dispensing machine. If the system receives a selection of peach, the system may cause a display of the beverage dispenser and a display of the mobile device to have the peach icon highlighted. Similarly, other graphical/visual/audio display features may be shared between two or more displays. When a user selects to dispense a beverage, once a threshold quantity of fluid has been dispensed for that beverage, the system can update the GUI to increment the number of bottles saved 416. In some embodiments, the system can track a total quantity of fluid dispensed and divide the total quantity of fluid dispensed by a configured value corresponding to a capacity of a bottle, and the system can update the GUI to show the number of bottles saved 416 as the result of the division.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general-purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language, or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. A beverage dispensing method, comprising:

communicating, via a near field sensor, a connection request between a beverage dispensing device and a mobile computing device, the connection request being to pair the mobile computing device with the beverage dispensing device;

generating, via at least one computing device, a session between the mobile computing device and the beverage dispensing device, wherein the session comprises replicating a user interface of the beverage dispensing device on the mobile computing device;

receiving, via the at least one computing device, at least one input from the mobile computing device during the session to obtain configuration parameters for a beverage;

causing, via the at least one computing device, the beverage to be dispensed from a nozzle based on the configuration parameters;

receiving, via the at least one computing device, a plurality of selections for a plurality of configuration options corresponding to at least one configuration parameter of the configuration parameters, wherein each of the plurality of configuration options correspond to a respective mobile computing device of a plurality of mobile computing devices;

determining, via the at least one computing device, a plurality of values individually corresponding to a respective one of the plurality of configuration options based on the plurality of selections;

ranking, via the at least one computing device, the plurality of configuration options based on the plurality of values; and transmitting, via the at least one computing device, an award to the respective mobile computing device corresponding to a highest ranked configuration option of the plurality of configuration options.

2. The beverage dispensing method of claim 1, wherein communicating the connection request between the beverage dispensing device and the mobile computing device comprises transmitting, via a near field transmitter, the connection request to the mobile computing device.

3. The beverage dispensing method of claim 2, wherein communicating the connection request between the beverage dispensing device and the mobile computing device further comprises:
   searching for the mobile computing device via the near field sensor; and
   connecting, via the at least one computing device, the beverage dispensing device to the mobile computing device.

4. The beverage dispensing method of claim 1, wherein communicating the connection request between the beverage dispensing device and the mobile computing device comprises receiving, via the near field sensor, the connection request from the mobile computing device.

5. The beverage dispensing method of claim 1, wherein the at least one computing device comprises the beverage dispensing device and a remote computing device.

6. The beverage dispensing method of claim 5 further comprising:
   verifying, at least one computing device, the identifier matches a current identifier associated with the beverage dispersing device.

7. The beverage dispensing method of claim 1, wherein the beverage dispensing device comprises the at least one computing device.

8. The beverage dispensing method of claim 1, wherein the connection request comprises an identifier.

9. The beverage dispensing method of claim 1 further comprising:
   verifying, via the at least one computing device, the identifier matches a current identifier associated with the beverage dispersing device.

10. The beverage dispensing method of claim 1, wherein causing the beverage to be dispensed from the nozzle comprising receiving, at the beverage dispensing device and from the at least one computing device, instructions to dispense the beverage from the nozzle.

11. A beverage dispensing system comprising:
   a beverage service that, when executed by one or more computing resources, causes the beverage dispensing system to:
      communicate, via a near field sensor, a connection request between a beverage dispensing device and a mobile computing device, the connection request being to pair the mobile computing device with the beverage dispensing device;
      generate a session between the mobile computing device and the beverage dispensing device, wherein the session comprises replicating a user interface of the beverage dispensing device on the mobile computing device;
      receive at least one input from the mobile computing device during the session to obtain configuration parameters for a beverage;
      the beverage to be dispensed from a nozzle based on the configuration parameters;
      receive a plurality of selections for a plurality of configuration options corresponding to at least one configuration parameter of the configuration parameters, wherein each of the plurality of configuration options correspond to a respective mobile computing device of a plurality of mobile computing devices;
      determine a plurality of values individually corresponding to a respective one of the plurality of configuration options based on the plurality of selections;
      rank the plurality of configuration options based on the plurality of values; and
      transmit an award to the respective mobile computing device corresponding to a highest ranked configuration option of the plurality of configuration options.

12. The beverage dispensing system of claim 11, wherein communicating the connection request between the beverage dispensing device and the mobile computing device comprises transmitting, via a near field transmitter, the connection request to the mobile computing device.

13. The beverage dispensing system of claim 12, wherein communicating the connection request between the beverage dispensing device and the mobile computing device further comprises:
   searching for the mobile computing device via the near field sensor; and
   connecting, via the one or more computing resources, the beverage dispensing device to the mobile computing device.

14. The beverage dispensing system of claim 11, wherein communicating the connection request between the beverage dispensing device and the mobile computing device comprises receiving, via the near field sensor, the connection request from the mobile computing device.

15. The beverage dispensing system of claim 11, wherein the one or more computing resources comprises the beverage dispensing device and a remote computing device.

16. The beverage dispensing system of claim 15, wherein the beverage service is further configured to cause the beverage dispensing system to further comprising:
   verify the identifier matches a current identifier associated with the beverage dispersing device.

17. The beverage dispensing system of claim 11, wherein the connection request comprises an identifier.

18. The beverage dispensing system of claim 11, wherein the beverage service is further configured to cause the beverage dispensing system to:
   verify the identifier matches a current identifier associated with the beverage dispersing device.

19. The beverage dispensing system of claim 11, wherein causing the beverage to be dispensed from the nozzle comprising receiving, at the beverage dispensing device and from the one or more computing resources, instructions to dispense the beverage from the nozzle.

20. The beverage dispensing system of claim 11, wherein the beverage service is further configured to cause the beverage dispensing system to receive a particular input associated with the particular configuration parameters from the particular mobile computing device to dispense a particular beverage from the nozzle.

* * * * *